United States Patent [19]
Kranert et al.

[11] 4,089,287
[45] May 16, 1978

[54] METHOD AND APPARATUS FOR THE AUTOMATIC POSITIONING OF A SHIP TO MINIMIZE THE INFLUENCE OF EXTERNAL DISTURBANCE FORCES

[75] Inventors: Klaus Kranert, Hamburg; Konrad Wilke, Wiesenweg, both of Germany

[73] Assignee: Licentia Patent Verwaltungs-G.m.b.H., Frankfurt am Main, Germany

[21] Appl. No.: 699,651

[22] Filed: Jun. 24, 1976

[30] Foreign Application Priority Data

Jun. 24, 1975 Germany ........................... 2528073

[51] Int. Cl.² ........................................... B63H 25/42
[52] U.S. Cl. ................................. 114/144 B; 318/588
[58] Field of Search ............... 73/178 R; 114/144 RE, 114/144 B; 180/79.1; 235/150.1, 150.2, 150.25; 318/588

[56] References Cited
U.S. PATENT DOCUMENTS 3,844,242 10/1974 Sernatinger et al. ............ 114/144 B
3,965,840 6/1976 Blumberg ......................... 114/144 B
3,987,744 10/1976 Blumberg et al. ............... 114/144 B

OTHER PUBLICATIONS

Kranert, K., et al., "Positioning of a Ship", AEG—Schiffbau, Hansa 11/1974 pp. 1001-1007.
Ball, A. E., et al., "Development of a Dynamic Ship Positioning System", GEC Journal of Science and Technology, vol. 42, No. 1, 1975, pp. 29-36.

Primary Examiner—Trygve M. Blix
Attorney, Agent, or Firm—Spencer & Kaye

[57] ABSTRACT

In order to automatically position a ship which is subjected to external disturbance forces and which is provided with propulsion units arranged to orient the ship in the direction of the resultant of such disturbance forces, there is derived a representation of a control value from the sum of the representations of the actual transverse forces acting on the ship, the control value representation is compared with a representation of a given nominal value, and the control value is brought to zero on the basis of the result of such comparison.

7 Claims, 5 Drawing Figures

METHOD AND APPARATUS FOR THE AUTOMATIC POSITIONING OF A SHIP TO MINIMIZE THE INFLUENCE OF EXTERNAL DISTURBANCE FORCES

BACKGROUND OF THE INVENTION

The present invention relates to a method for the automatic positioning of a ship, particularly a drilling ship, by which the ship can be moved, by propulsion means, in the direction of the main external disturbance, or position deviation, forces.

In order to perform the so-called dynamic positioning of a ship there must be provided propulsion systems which act to hold the ship accurately at a working position. Examples of the type of ship involved are measuring ships, research ships and drilling ships. The propulsion systems are drive propellers with pivotal slipstream (e.g. Voigt-Schneider, Schottel) or adjustable propellers. Such systems are presently being produced only up to medium power capacities. To meet higher power requirements, transverse thrust arrangements may be provided. It is also possible to combine transverse thrust systems with active propellers.

Since transverse thrust systems possess a lower total system efficiency than do active propellers for certain directions of the external disturbance forces, they must be installed right from the start to be capable of satisfying higher power requirements.

When a ship is being dynamically positioned, the ship is preferably placed with its bow facing in the direction of the resultant of the disturbance forces since in this position it will have the lowest wind, water and wave resistance, i.e. the external influences will apply the lowest force levels to the ship.

Disturbance forces which attack a ship from an oblique direction even further reduce the efficiency of transverse thrusters since, due to the technical design concepts involved, such systems cannot be adjusted in the direction of the effective disturbance forces but must compensate the forces by providing thrust components in the longitudinal and transverse directions, the transverse direction being at right angles to the longitudinal axis of the ship.

Methods which attempt to regulate the disturbance torque acting on a ship so that it becomes zero cannot be successful, for example if the ship has an asymmetrical superstructure, which is usually the case for the above-mentioned special types of ships. A further drawback of this process is that the curve representing the disturbance torque as a function of ship heading direction has two minima within an angular range of $\pi/2$, so that when there is a sudden change in the direction of the resultant disturbance force, for example due to a shift in the wind, unstable states may develop.

SUMMARY OF THE INVENTION

It is an object of the present invention to dimension and optimize the driving power required to position a ship in such a way that the effect of the forces to be nullified over the path of the ship and/or the force required for the propeller thrusts can be reduced to a minimum.

This and other objects are accomplished according to the present invention by obtaining a control value from the sum of the actual transverse forces, comparing the control value with a given nominal value and bringing the control value to zero in a control device. For this purpose, the transverse forces related to the magnitude and direction of the thrust of the propulsion means can be monitored and fed to the control device as the control value. It is also conceivable, however, to determine the transverse forces by vector addition of the disturbance forces such as those produced by wind and waves. It is further possible to obtain the resulting nominal value for the transverse force acting on the ship and to feed it to the control device as the regulating value.

The significant advantages of the method of the invention are that if the course, or heading, of the ship is adjusted to the disturbance forces so that the transverse forces become zero, only a residual disturbance moment need be compensated. Due to the long lever arms represented by the length of the ship, this compensation requires only very little power. Since dynamically positioned ships are designed to be capable of handling maximum disturbance forces, i.e. the propellers operate in a partial load range most of the time, the bow propellers operate under reduced load so that large amounts of fuel are saved.

DESCRIPTION OF THE PREFERRED EMBODIMENTS

Figure 1:
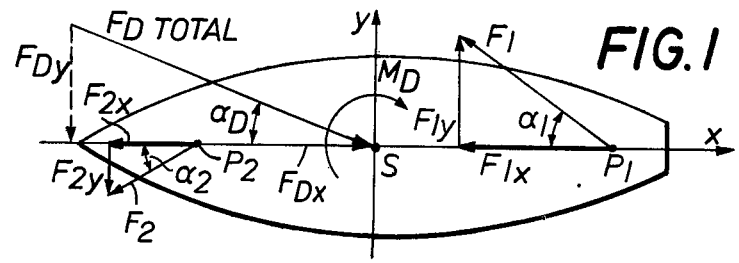
FIG. 1 is a vector diagram in plan view of the external disturbance forces attacking a ship and the disturbance moments, as well as the counteracting thrust forces and directions.

Referring to FIG. 1, it is assumed that the total external disturbance force $F_{D\,total}$ which consists of the components $F_{Dy}$ and $F_{Dx}$, acts at the center of gravity S of the ship. It is assumed to act in a resultant direction indicated by the angle $\alpha_D$. The ship is equipped with propeller drives $P_1$ and $P_2$ for the stern and bow drive assemblies, respectively.

The thrust force $F_1$ made up of orthogonal components $F_{1x}$ and $F_{1y}$ and forming angle $\alpha_1$ with the longitudinal ship axis, and thrust force $F_2$ made up of orthogonal components $F_{2x}$ and $F_{2y}$ and forming angle $\alpha_2$ with that axis, are directed against the main external disturbance forces. If it is assumed that the sum of the transverse forces is to become zero according to the equation $$F_{y\,total} = F_{1y} + F_{2y} = \text{zero},$$

the control value can be obtained according to any one of the following procedures:

(a) Formation of actual values from the measured values $F_1$, $\alpha_1$ and $F_2$, $\alpha_2$. In order for $F_{y\,total} = F_{1y} + F_{2y}$ to become zero, it can apply for the propeller drive $P_1$:

$$(F_{1y}/F_1) = \sin \alpha_1 \text{ or } F_{1y} = F_1 \cdot \sin \alpha_1$$

and for $P_2$:

$$(F_{2y}/F_2) = \sin\alpha_2 \text{ or } F_{2y} = F_2 \cdot \sin\alpha_2.$$

Consequently:

$$F_{y\,total} = F_1 \cdot \sin\alpha_1 + F_2 \cdot \sin\alpha_2.$$

(b) Formation of the actual values from the nominal value $F_{y\,nom}$ $F_{y\,nom}$ is the control device output representing the $y$ component of the displacement of the ship with respect to the given nominal position value and is thus proportional to the thrust value in the $y$ direction, $F_{y\,total}$, which is to be formed. The regulator 11 in FIG. 2 has to form desired forces in dependence on path differences in such a way that the resulting actual forces will cause a reduction in the input differences.

If this value $F_{y\,total}$ is used as the regulating value, it has the advantage over the solution according to (a), above, that the delay periods inherent in the drive systems are eliminated. A further advantage is that $F_{y\,nom}$ has already been processed and no other measuring devices are required.

(c) Compilation of the thrust values and thrust directions of the stern and bow propellers.

Vector addition of the external force vectors attacking at point S of the ship defined by their magnitude and direction with respect to the total external force value, e.g. direction of flow, velocity of flow, wind, waves, in which the relationships between external force values such as wind velocity and wind direction specific to the particular ship and the resistance values such as wind resistance of the ship must be considered, then produces $$(F_{y\,total}/F_{D\,total}) = \sin\alpha_D$$

or $$F_{y\,total} = F_{D\,total} \cdot \sin\alpha_D$$

The above-described derivation of the control value has the advantage of the immediate introduction of the value $F_{D\,total}$ into the computer without any delay due to the ship's time constant, but it has the drawback of being inaccurate since inaccuracies may of course occur during the compilation of the external force values. A ship's time constant is the point of intersection between the tangents at zero point and at the ultimate value of the angular speed curve when the rudder angle is preset with a jerk.

(d) A further possibility is a combination of the computations mentioned in (a) and (c) or in (b) and (c), respectively. If the calculation according to (c) is fed into the computer without delay a rapid rough adjustment is possible which is superimposed on a fine adjustment according to the first calculation (a) or (b). With the values fixed in the ship this can provide much more accuracy. The uppermost connection line from the ship 15 of FIG. 2 to the acting disturbance variables represents the effect which the position and movement of the ship have on these variables.

Figure 2:
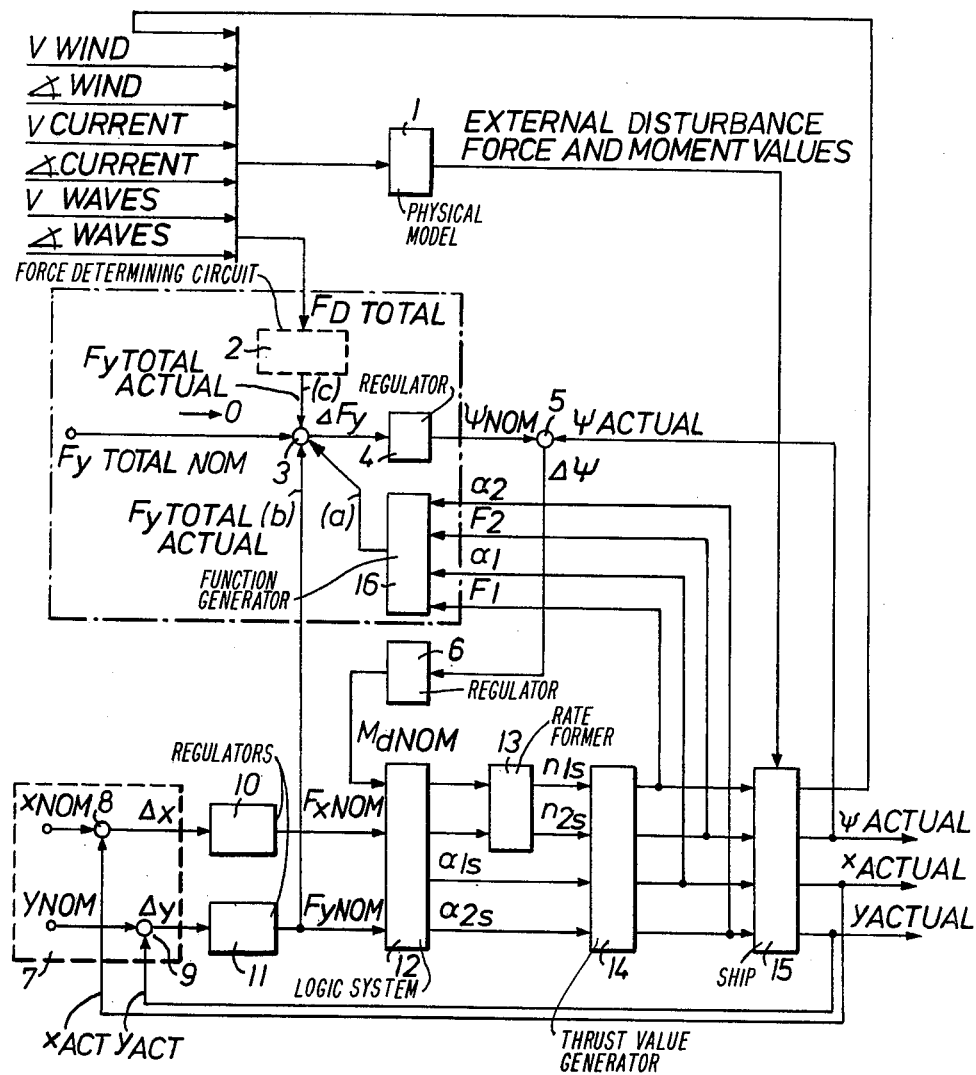
FIG. 2 is a block circuit diagram of one embodiment of a control device according to the invention in conjunction with an entire control system.

In the block circuit diagram of FIG. 2 the vertical line at the top left designates a combining of the external force values acting on the ship, such as wind velocity and wind direction, current velocity and current direction, and wave velocity and wave direction.

Block 1 constitutes the physical model for forming the external force values with which the external disturbance forces and moments act on the ship. Block 1 shows the disturbance variables affecting the ship in the various degrees of freedom by means of mathematical equations.

Unit 2 is a circuit which determines, from the various parameters, the external force acting on the ship in the $y$ direction, i.e. the actual value of the total transverse disturbance force $F_{y\,total\,actual}$ to which procedure (c), above, is directed.

In a comparison device 3, this value is compared with a nominal value $F_{y\,total\,nom}$, which is to become zero.

The resulting deviation $\Delta F_{y\,total}$ is fed to a regulator 4 which forms a representation of the nominal value for the ship's course $\Psi_{nom}$ from the deviation of the transverse force, $\Delta F_{y\,total}$. A comparison with the measured ship's course in circuit 5 furnishes the course deviation $\Delta \Psi$, which is fed to a further regulating member 6 and results in the nominal value for the torque $M_{d\,nom}$. Block 4 establishes a preset function by means of a regulator which determines the desired ship's course $\Psi_{nom}$ in dependence on the preset $\Delta F_{y\,total}$. Like blocks 10 and 11, block 6 is a PID regulator. In FIG. 1, $M_{d\,nom}$ is composed of the values $F_{1y} \cdot SP_1$ or $F_{2y} \cdot SP_2$, i.e. the propulsion elements multiplied by the size of the distance of these elements from the center of gravity. This size depends on the propulsion system and the distance and is, for instance, approximately 2 to $3 \cdot 9.81 \cdot 10^5$ Nm (Newton-meters) in the case of a tuna catcher with a length of about 80 m.

The nominal values for the longitudinal coordinate $x_{nom}$ and the transverse coordinate $y_{nom}$ of the ship's position are fed into a nominal-actual location comparator 7 and are compared in comparator elements 8 and 9 with the respective actual values. The resulting deviations $\Delta x$ and $\Delta y$ are fed into regulators 10 and 11 to provide representations of the total longitudinal thrust $F_{x\,nom}$ and the total transverse thrust $F_{y\,nom}$, the latter providing the control actual value representation according to procedure (b).

A permanently wired or freely programmable logic system 12 for the thrust distribution, including a rate of rotation former 13, determines, from the input values $M_{d\,nom}$, $F_{x\,nom}$ and $F_{y\,nom}$, the rates of rotation $n1s$ and $n2s$ for the stern and bow drives as well as further input values for device 14 to produce the desired thrust. $\alpha_{1s}$ and $\alpha_{2s}$ show the desired directions for the thrusts of Schottel propulsions 1 and 2. All values entering block 14 are nominal values and all values leaving it are actual values.

The output signals from this device 14 represent the thrust values $F_1$ and $F_2$ as well as the thrust directions $\alpha_{1s}$ and $\alpha_{2s}$ which act as force components on ship 15. Ship 15 then undergoes the resulting movement, which includes a heading shift toward $\Psi_{nom}$ and translations toward $x_{nom}$ and $y_{nom}$ and which thus has a reducing effect on the external disturbance values.

The outputs from unit 14 are also supplied to a function generator device 16 whose output provides the control value representation according to procedure (a).

The apparatus operates as follows:

The input values for the automatic control to optimize the ship's course for dynamic positioning can be obtained in different ways:

The thrust forces $F_1$ and $F_2$ and directions $\alpha_1$ and $\alpha_2$ can be determined according to procedure (a), above. The available input values at the comparison location 3 are thus the actual value of the sum of the transverse forces $F_{y\,total\,actual}$ acting on the ship and the nominal value of the sum of the transverse forces $F_{y\,total\,nom} = 0$.

The actual course $\Psi_{act}$ which is the result of a reaction of the torque acting on the ship as a setting value emanating from the propellers is another parameter. The output signal of the automatic control system is the torque nominal value $M_{d\ nom}$ which is converted into setting values for $F_1$, $\alpha_1$ and $F_2$, $\alpha_2$ by the calculating algorithm block 12. $x_{nom}$ and $y_{nom}$ are the results of a previous calculation. Nominal values are derived from actual values, e.g. from measuring with a transponder in a drilling location. $F_{y\ total\ nom} = 0$ results from the demand that no lateral forces in the y-direction are allowed to affect a vessel.

According to a second possibility based on procedure (c), above, by vector addition of the attacking disturbance vectors due, for example, to current wind and waves and representing both their magnitude and direction, which are fed into regulator 1, the total disturbance force $F_{D\ total}$ is determined. This requires ship-specific relationships of disturbance values, e.g. wind velocity and direction and the resistance values, e.g. wind resistance. Specific ship's variables are the shape and length of superstructures, as well as coefficents which are also determined by the shape of the ship. In FIG. 2 this possibility is illustrated by block 2 which is shown in dashed lines. The output signal from block 2 is then the actual value of the total disturbance force instead of the sum of the transverse forces acting on the ship. This actual value is present at comparison location 3. This does not make it necessary to change the other input variables, in the present case c with $F_{y\ total\ nom} = 0$. The parameters of blocks 4 and 6 must, however, be adapted accordingly.

The method according to procedure (c) has the advantage that the introduction of $F_{y\ total}$ can take place earlier than in procedure (a) or (b), respectively, i.e. without a delay due to the ship's time constant. It thus constitutes a rough adjustment which can be superimposed on a fine adjustment according to procedure (a) or (b). The superimposition of procedures (a) and (b) or (a) and (c), respectively, can be used to calculate the total setting force for the drives.

A determination of the setting values for the front and rear propellers with thrust F and direction $\alpha$ must meet the requirement that the propellers not work counter to one another, i.e. $F_{1x}$ and $F_{2x}$ must have the same algebraic sign. This requirement is satisfied if:

$$|F_{1x} + F_{2x}| \geq F_{1x},$$

which means that the absolute value of the sum of the first and second values must be at least equal to the first value.

According to the invention, an automatic system is utilized which controls the propellers so that the thrust of the rearward propeller in the longitudinal direction has a variable but absolutely positive ratio to the front propeller:

$$F_{1x} = a \cdot F_{2x}$$

$$(F_{1x}/F_{2x}) = a,$$

where $a$ is always positive.

Since, during positioning, the ship is constantly aligned with its bow toward the external disturbance forces, a control scanner maximizes the ratio of the longitudinal thrusts $F_{1x}/F_{2x}$ which is limited only by the maximum power of $F_1$.

This results in a significant reduction of the total driving power capacity which needs to be provided. The reduction is determined by the shift of power from the front propeller drive to the rear propeller drive by:

I. reduced influence of the front propeller on the rear propeller, i.e. the efficiency of the rear propeller becomes greater since its intake velocity is not influenced by the slipstream of the front propeller;

II. reduced frictional forces on the ship because the increased flow of water against it which would have been produced by the front propeller is substantially eliminated; and III. switching off of one of two, or two of three, front propellers if the shift in power to the rear propeller permits such action.

Figure 3:
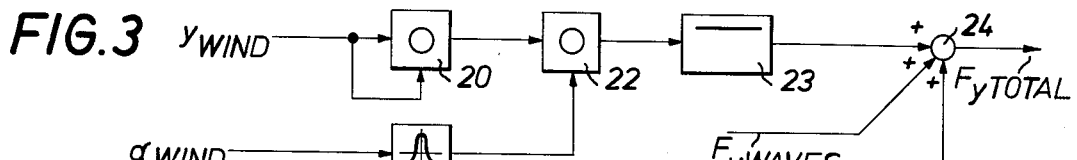
FIG. 3 is a possible circuit arrangement for block 2 in FIG. 2.

In summary, it can be stated that the automatic control system for optimizing the required power has the nominal values for forces and moments as input values. The individual nominal thrusts are calculated according to known equations for moments and forces. With a permanently wired or programmed logic in block 12 the propeller thrusts are prevented from acting counter to one another and a control scanner brings this ratio to a maximum, i.e. it regulates until $F_1 \rightarrow F_{1\ max}$. FIG. 3 shows a possible circuit arrangement for block 2 in FIG. 2. The wind velocity $V_{wind}$ is led into a multiplier 20 which forms the $V^2$. The cos-function is formed in a function transmitter 21 according to the direction of the wind. Both values are present at another function transmitter 22, the output value of which is provided with a factor in 23 to become the disturbance force of the wind $F_y$. In an adding point 24 the other disturbance forces of current and waves acting in the y-direction are added to form the total disturbance force component $F_{y\ total}$ in the y-direction.

Figure 4:
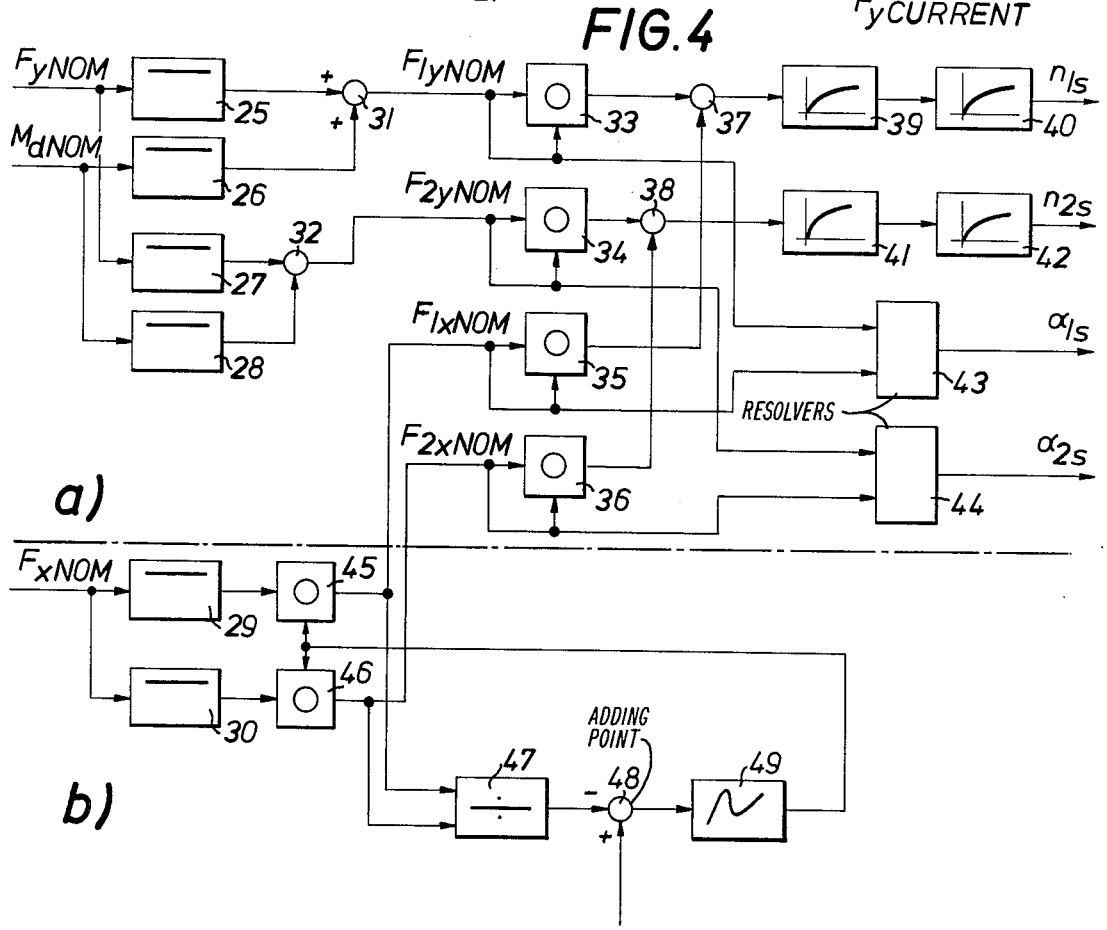
FIG. 4 is a connection arrangement for thrust distribution 12 as per FIG. 2, destined for two Schottel propulsions.

FIG. 4 shows a connection arrangement for thrust distribution 12 as per FIG. 2, destined for two Schottel propulsions. The input values $F_{y\ nom}$, $F_{x\ nom}$ and $M_{d\ nom}$ are present at evaluation steps 25, 26, 27, 28, 29 and 30. $F_{y\ nom}$ and $M_{d\ nom}$ are added in adding steps 31 and 32 to form the desired thrust values in the y-direction $F_{1y\ nom}$ and $F_{2y\ nom}$. These values are squared in multipliers 33 and 34 and added in summarizers 37 and 38 to the squared values in the x-direction multipliers 35 and 36.

The output signals are converted in the two subsequent root extractors 39, 40 and 41, 42 respectively to the desired speed values $u_{1s}$ and $u_{2s}$.

The desired values in the x- and y-directions are also led to resolvers 43 and 44, the outputs of which form the desired values for the thrust directions of propulsion units 1 and 2.

For the x-direction, the signals in evaluation steps 29 and 30 are led to multipliers 45 and 36 to be converted into the desired values $F_{1x\ nom}$ and $F_{2x\ nom}$. These signals are brought to a divider 47 for correction, the output signal is compared with a preset value in an adding point 48, and any deviation is fed back through a regulator 49 to multipliers 45 and 46.

Figure 5:
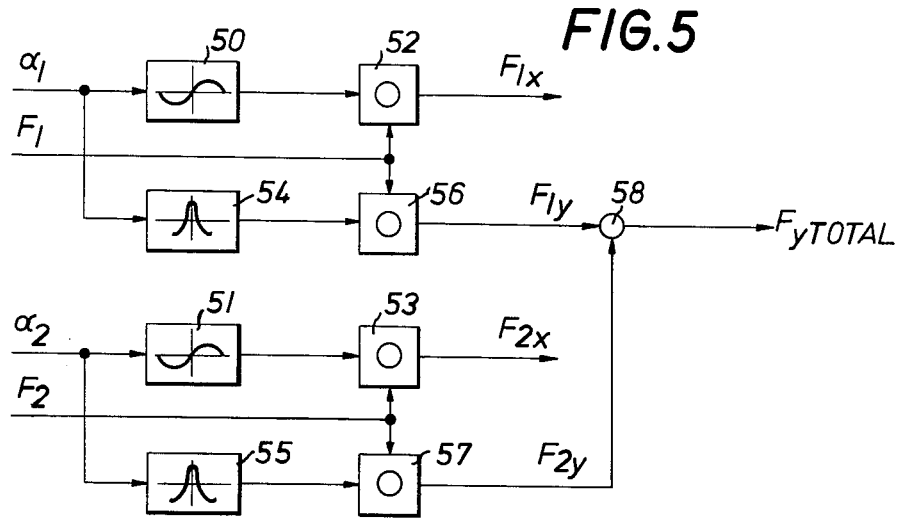
FIG. 5 is a circuit diagram of one embodiment of device 16 of FIG. 2.

The actual values $\alpha 1$, $\alpha 2$, $F1$ and $F2$ which are present at block 16 of FIG. 2 are changed by calculation to a common $F_{y\ total}$ as per FIG. 5. The direction signals $\alpha 1$ and $\alpha 2$ are present at the input of 50 and 51.

Their output signals are fed into multiplier 52 and 53 where they are multiplied by the thrust forces F1 and F2. Thrust forces F $1x$ and F $2x$ occur at the outputs.

The same input values α1 and α2 are led via further 54 and 55, multipliers 56 and 57 and an adding point 58 to produce the total thrust force $F_{y\ total}$.

It will be understood that the above description of the present invention is susceptible to various modifications, changes and adaptations, and the same are intended to be comprehended within the meaning and range of equivalents of the appended claims.

What is claimed is:

1. In a method for automatically positioning a ship subjected to external disturbance forces and provided with propulsion means arranged to orient the ship in the direction of the resultant of such disturbance forces, the improvement comprising: deriving a representation of a control value from the sum of the representations of the actual transverse forces acting on the ship; comparing such control value representation with a representation of a given nominal value; and bringing such control value to zero by operating the propulsion units to cause the ship to become oriented in the direction of the resultant of such disturbance forces under the action of a control device and on the basis of such comparison.

2. A method as defined in claim 1 further comprising determining the instantaneous nominal value for the transverse force of the ship and feeding a representation of such determined value to the control device as an actual value representation.

3. In a method for automatically positioning a ship subjected to external disturbance forces and provided with propulsion means arranged to orient the ship in the direction of the resultant of such disturbance forces, the improvement comprising: deriving a representation of a control value from the sum of the representations of the actual transverse forces acting on the ship; comparing such control value representation with a representation of a given nominal value, and bringing such control value to zero under the action of a control device and on the basis of such comparison, and wherein the representations of the transverse forces are derived from indications of the magnitude and direction of thrust of the propulsion means and the vector sum thereof is supplied to the control device as an actual transverse force value representation.

4. A method as defined in claim 3 wherein said step of deriving comprises determining the transverse forces by the vector addition of the external disturbance force values.

5. In a method for automatically positioning a ship subjected to external disturbance forces and provided with propulsion means arranged to orient the ship in the direction of the resultant of such disturbance forces, the improvement comprising: deriving a representation of a control value from the sum of the representations of the actual transverse forces acting on the ship; comparing such control value representation with a representation of a given nominal value; bringing such control value to zero under the action of a control device and on the basis of such comparison; and determining the current nominal value for the transverse force of the ship and feeding a representation of such determined value to the control device as an actual value representation, wherein said step of deriving comprises determining the transverse forces by the vector addition of the external disturbance force values.

6. In apparatus for automatically positioning a ship while it is subjected to external disturbance forces, the ship being provided with two longitudinally separated propulsion units arranged to orient the ship in the direction of the resultant of such disturbance forces, the improvement comprising: means for deriving a representation of a control value from the sum of representations of the actual transverse forces acting on the ship; comparator means connected to receive such representation with a representation of a given nominal value; a control device connected for reducing such control value to zero; and means connected for controlling the longitudinal thrust produced by said propulsion units in a manner to establish a positive ratio of variable magnitude between the longitudinal thrust levels produced by said two units, and including control means for increasing the ratio until the maximum thrust capacity of that one of said units which is closer to the stern of the ship has been reached.

7. Apparatus as defined in claim 6 wherein said control device is connected to control the operation of said propulsion units in a manner to cause the ship to become oriented in the direction of the resultant of such disturbance forces.

* * * * *